(12) United States Patent
Amaoka et al.

(10) Patent No.: US 6,513,757 B1
(45) Date of Patent: Feb. 4, 2003

(54) WING OF COMPOSITE MATERIAL AND METHOD OF FABRICATING THE SAME

(75) Inventors: Kazuaki Amaoka, Tokyo-To (JP); Takayuki Nagao, Tokyo-To (JP); Atsushi Harada, Tokyo-To (JP); Naoya Takizawa, Tokyo-To (JP); Hideyuki Sano, Tokyo-To (JP); Yasuhiro Toi, Tokyo-To (JP); Megumi Hiraki, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/616,399

(22) Filed: Jul. 14, 2000

(30) Foreign Application Priority Data

Jul. 19, 1999 (JP) ............................................. 11-204451
Aug. 4, 1999 (JP) ............................................. 11-221637
Sep. 30, 1999 (JP) ............................................. 11-278500

(51) Int. Cl.$^7$ .................................................. B64C 1/00
(52) U.S. Cl. .................. 244/123; 244/117 R; 428/119; 428/131; 428/133; 416/223 R; 416/233
(58) Field of Search .................................. 244/123, 124, 244/117 R, 35 R; 428/119, 98, 131, 133; 416/223 R, 227 R, 229 R, 233

(56) References Cited

U.S. PATENT DOCUMENTS

| 4,051,289 A | * | 9/1977 | Adamson ..................... 428/113 |
| 5,332,178 A | * | 7/1994 | Williams ..................... 244/123 |
| 5,476,704 A | * | 12/1995 | Kohler ........................ 428/119 |
| 5,501,414 A | * | 3/1996 | Bauer .......................... 244/124 |
| 6,173,925 B1 | * | 1/2001 | Mueller et al. ............. 244/219 |
| 6,217,000 B1 | * | 4/2001 | Younie et al. .............. 249/184 |
| 6,237,873 B1 | * | 5/2001 | Amaoka et al. ............ 244/123 |

* cited by examiner

Primary Examiner—J. Woodrow Eldred
(74) Attorney, Agent, or Firm—Martin A. Farber

(57) ABSTRACT

A wing of composite material has an upper skin, a lower skin and a plurality of intermediate spars arranged between the upper and the lower skin. The intermediate spars extend from roots to tips of the upper and the lower skins. The intermediate spars are integrally formed with the upper and the lower skins or are adhesively bonded to the upper and the lower skins. The wing has a small number of parts, needs greatly reduced time for fabrication and can be fabricated at a low cost.

10 Claims, 13 Drawing Sheets

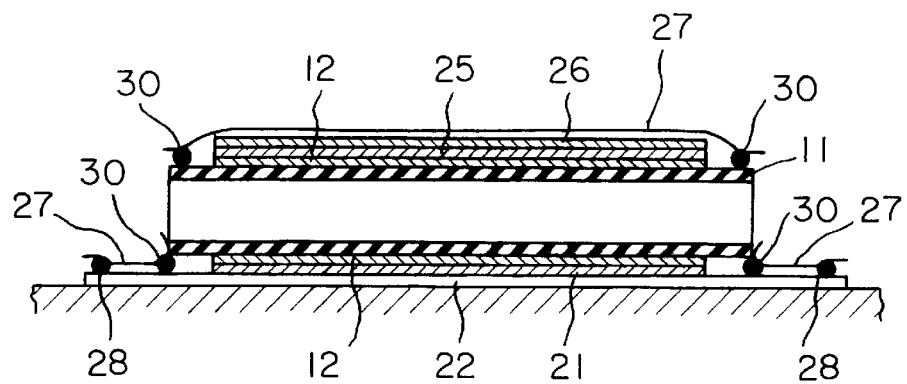
F I G. 5
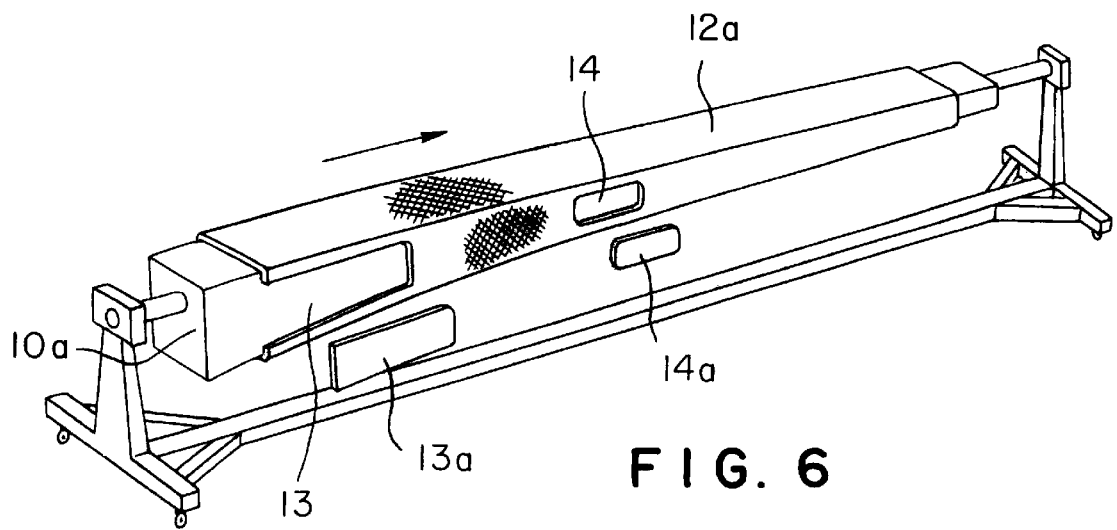
F I G. 6

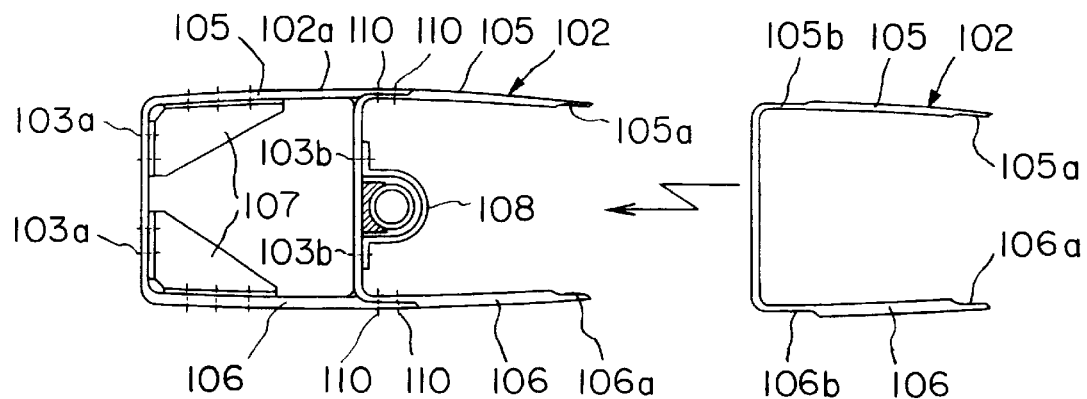
F I G. 15
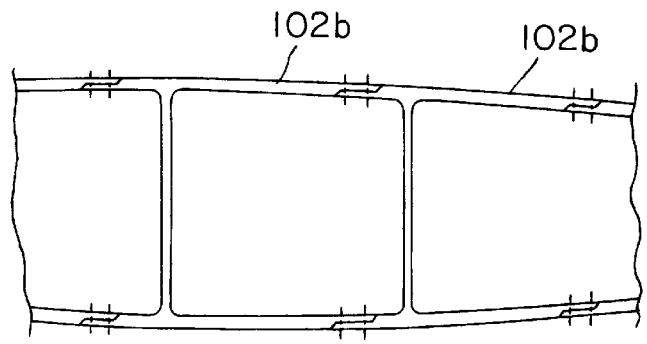
F I G. 16
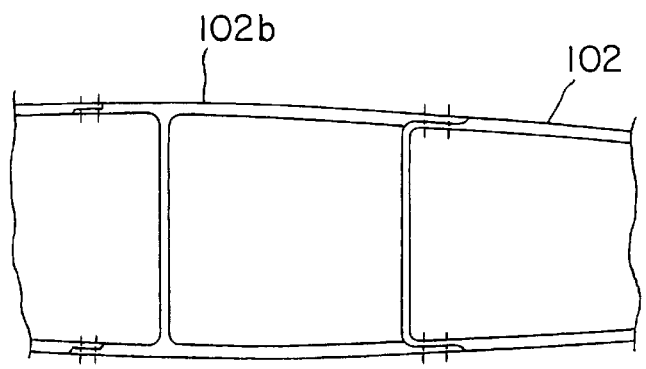
F I G. 17

WING OF COMPOSITE MATERIAL AND METHOD OF FABRICATING THE SAME

BACKGROUND OF THE INVENTION

1. Field of the Invention

The present invention relates to a wing of composite material for constructing an aircraft airframe and a method of fabricating the same.

2. Description of the Related Art

An aircraft wing of composite material is constructed by assembling a lower skin, an upper skin, spars and ribs by using assembling jigs and fastening together the lower skin, the upper skin, the spars and the ribs by using fastening means. Alternatively, an aircraft wing of composite material is constructed by forming a combined structure of composite material integrally including a lower skin (or an upper skin), spars and ribs and fastening an upper skin (or a lower skin) to the combined structure by using fastening means.

The aircraft wing of composite material formed by fastening together the component members is a heavyweight structure comprising a large number of component parts. Since work for assembling the aircraft wing needs special assembling jigs, the aircraft wing is costly.

The aircraft wing constructed by using the combined structure having either the lower skin or the upper skin is based on the conventional concept of structure, jigs and processes are complicated and hence the aircraft wing is costly.

SUMMARY OF THE INVENTION

The present invention has been made in view of the foregoing circumstances. Therefore, a first object of the present invention is to provide a wing of composite material having a greatly reduced number of component parts, and capable of being assembled by greatly reduced manhours and of being fabricated at a low cost, and a method of fabricating such a wing.

Another object of the present invention to provide a wing of composite material having an improved appearance, and capable of being formed in dimensions of an improved accuracy, and a method of forming such a wing.

According to an aspect of the present invention, a wing of composite material comprisies: upper and lower skins, each of which has a root and a tip; and a plurality of intermediate spars arranged between the upper and the lower skins; wherein the plurality of intermediate spars extend from the roots to the tips of the upper and lower skins, and are integrally formed with or adhesively bonded to the upper and the lower skins.

Preferably the plurality of intermediate spars are provided with openings in their side walls, and reinforcing members are passed through the openings and are bonded to the upper and the lower skins and the intermediate spars.

Two additional spars may extend from the roots to the tips, on opposite sides of the intermediate spars, and may be bonded to the upper and the lower skins.

Preferably, the wing of composite material is an aircraft main wing, and the intermediate spars extend from a wing root toward a wing tip.

According to an aspect of the present invention, a method of fabricating a wing of composite material comprising an upper skin, a lower skin and a plurality of intermediate spars arranged side by side so as to extend from roots toward tips of the upper and the lower skins, comprises the steps of: forming through holes in side walls of the plurality of intermediate spars; disposing the plurality of intermediate spars on one of the skins so that the through holes are aligned with each other; disposing the other skin on the plurality of intermediate spars; integrally forming the plurality of intermediate spars and the skins or adhesively bonding together the plurality of intermediate spars and the skins; and passing reinforcing members through the through holes of the plurality of intermediate spars and bonding the reinforcing members to the plurality of intermediate spars and the skins.

Preferably, the step of forming through holes in side walls of the plurality of intermediate spars includes the steps of: forming portions in which any prepreg sheets are not superposed in prepreg structures by intermittently superposing prepreg sheets on a hollow heat-resistant rubber bag; closing the portions in which any prepreg sheets are not superposed with closing members; curing the prepreg structures formed by superposing prepreg sheets; and removing the closing members from the prepreg structures after curing.

Alternatively, the step of forming through holes in side walls of the plurality of intermediate spars includes the steps of: winding rovings around a laminating jig to form a roving structure; cutting out portions of the roving structure formed on the laminating jig to form openings; closing the openings with closing members; impregnating the roving structure with a resin and curing the resin-impregnated roving structure; and removing the closing members from the resin-impregnated roving structure after curing.

According to an aspect of the present invention, a wing of composite material comprises a plurality of intermediate spars of composite material each having upper and lower flanges forming sections of upper and lower skins, and a web formed integrally with and extending between the upper and lower flange; wherein the plurality of intermediate spars are united together so that surfaces of the upper and lower flanges form surfaces of the upper and the lower skin, respectively.

Preferably, each intermediate spar having the upper and the lower flanges and the web has a U-shaped cross section, adjacent intermediate spars are united together in such a manner that outer surfaces of portions of the flanges contiguous with an outer surface of the web of one of the intermediate spars are in contact with inner surfaces of edge portions of the flanges of the other intermediate spar, and the portions of the adjacent intermediate spars in contact with each other are fastened together with fasteners.

Preferably, the wing is an aircraft main wing, and the intermediate spars extend from a wing root toward a wing tip.

According to an aspect of the present invention, a wing of composite material comprises: upper and lower skins of composite material provided with stiffening parts on inner surfaces thereof, respectively; and flat plates extended between and united to the upper and the lower skin by adhesively bonding opposite edge portions thereof to the stiffening parts.

Preferably, the flat plates extend between a wing root and a wing tip.

Preferably, the number of the flat plates is at least three, and the flat plates are disposed in a parallel arrangement.

Preferably, each of the stiffening parts has a flat side surface to which a flat plate is bonded.

According to an aspect of the present invention, a method of fabricating a wing of composite material, comprises the steps of: forming upper and lower skins of a fiber-reinforced resin composite material having stiffening parts on inner surfaces thereof, respectively; placing the upper and the lower skin at an interval in a die; disposing flat plates between the upper and the lower skin in such a manner that upper and lower edge portions thereof face the stiffening parts, respectively; and uniting together the upper and the lower skin by adhesively bonding the upper and the lower edge portions of the flat plates to the stiffening parts.

According to an aspect of the present invention, a method of fabricating a wing of composite material comprises the steps of: forming upper and lower skins of a fiber-reinforced resin composite material having stiffening parts on inner surfaces thereof, respectively; placing the lower skin on a lower half die; disposing forming jig having pressing jigs and stretchable jig on the lower skin; disposing flat plates in such a manner that lower edge portions thereof face the stiffening parts of the lower skin, respectively; placing the upper skin on the forming jigs in such a manner that the stiffening parts thereof face upper edge portions of the flat plates, respectively; placing an upper half die on the upper skin; clamping together the upper and the lower half die; and pressing the upper skin against an inner surface of the upper half die and pressing the upper and the lower edge portions of the flat plates against the stiffening parts of the upper and the lower skin to unit together the upper and the lower skin.

BRIEF DESCRIPTION OF THE DRAWINGS

FIG. 5 is a sectional view taken on line A—A of FIG. 4;

FIG. 6 is a perspective view of another laminating device for fabricating an intermediate spar of a wing of composite material;

FIG. 15 is a view of intermediate spars of a wing of composite material in a phase after a joining process;

FIG. 16 is a view of joined intermediate spars having an I-shaped cross section;

FIG. 17 is a view of an intermediate spar having an I-shaped cross section and an intermediate spar having a U-shaped cross section joined together;

DESCRIPTION OF THE PREFERRED EMBODIMENTS

Preferred embodiments of the present invention will be described hereinafter with reference to the accompanying drawings.

Figure 1:
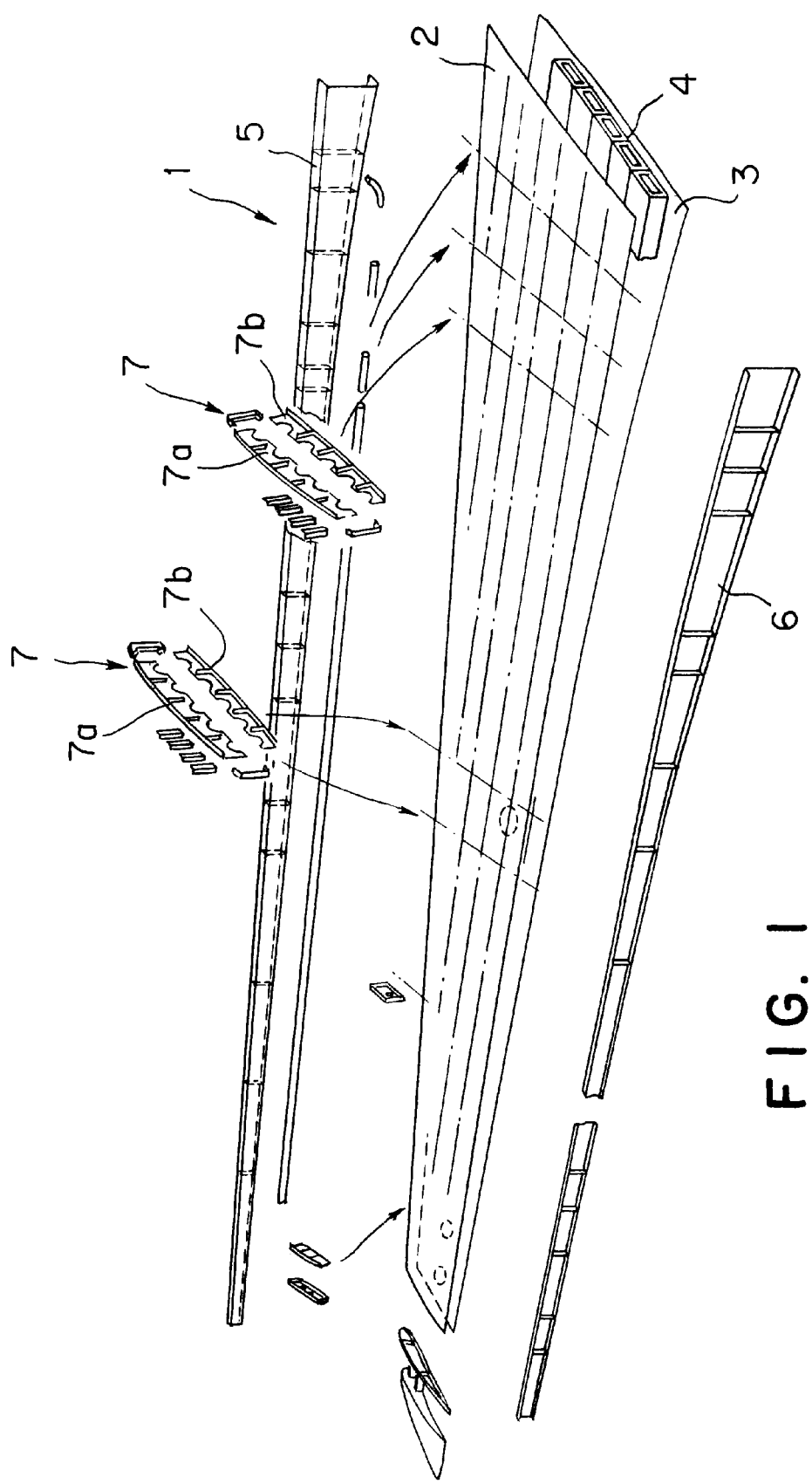
FIG. 1 is an exploded perspective view of an aircraft main wing of composite material in a first embodiment according to the present invention.

FIG. 1 is an exploded perspective view of an aircraft main wing of composite material in a first embodiment according to the present invention. An aircraft main wing 1 has an upper skin 2, a lower skin 3 and a plurality of intermediate spars 4 disposed between the upper skin 2 and the lower skin 3. The upper skin 2, the lower skin 3 and the intermediate spars 4 are made of a fiber-reinforced resin composite material. The upper skin 2, the lower skin 3 and the intermediate spars 4 are united together in an integral box structure by a thermocompression process.

In the aircraft main wing 1 shown in FIG. 1, the five intermediate spars 4 are arranged contiguously with respect to a front-rear direction (a direction perpendicular to a span of the aircraft main wing 1) so as to extend from a wing root toward a wing tip. Some of the five intermediate spars 5 terminate at the wing tip. When the intermediate spars 4 are tapered toward the wing tip, the intermediate spars 4 can be arranged side by side so that all the intermediate spars 4 extend from the wing root to the wing tip.

A front edge and a rear edge of the integral box structure are trimmed. A front spar 5 is fastened to the front edge with ordinary fasteners, and a rear spar 6 is fastened to the rear edge with ordinary fasteners.

Figure 2:
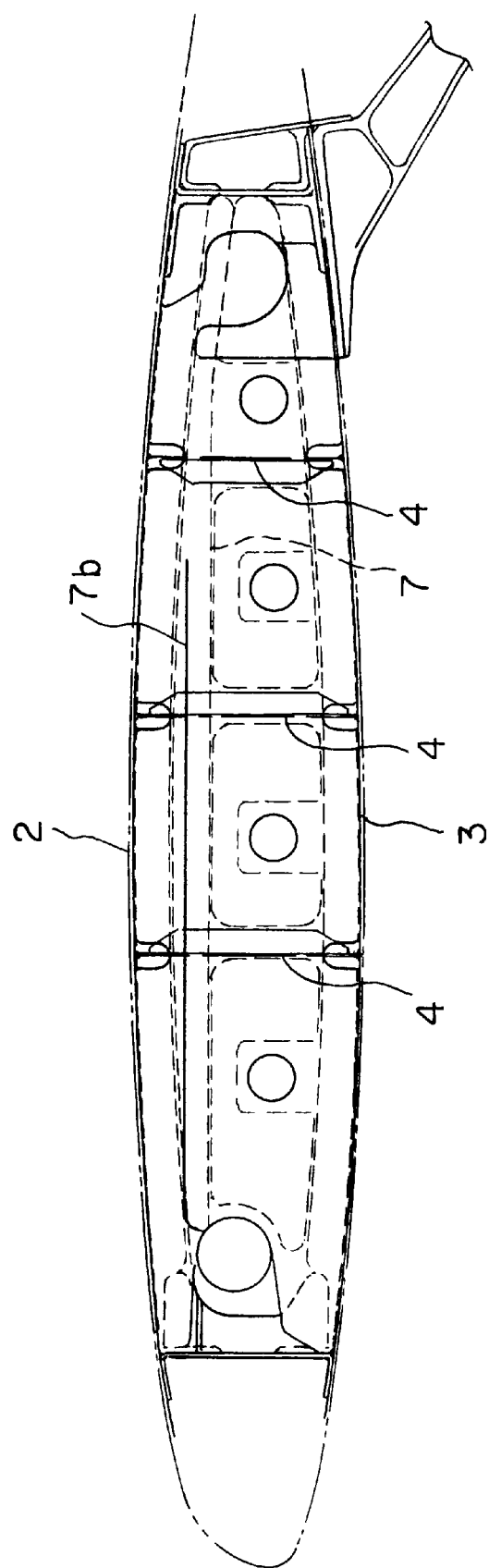
FIG. 2 is an enlarge sectional view of the main wing shown in FIG. 1.

A plurality of stiffening ribs 7 are disposed at predetermined longitudinal positions on the main wing 1. Each rib 7 is formed of an upper member 7a and a lower member 7b. As shown in FIG. 2, each rib 7 is joined to the upper skin 2, the lower skin 3 and the intermediate spars 4 to provide the main wing 1 with structural strength and rigidity. In this embodiment, each rib 7 is split into the upper and the lower members, and the upper and the lower members are formed by molding and are inserted in the main wing 1 through openings formed in the intermediate spars 4.

A method of fabricating the wing of composite material will be explained.

At first, a method of laminating thermosetting composite material with prepreg will be explained.

Figure 3:
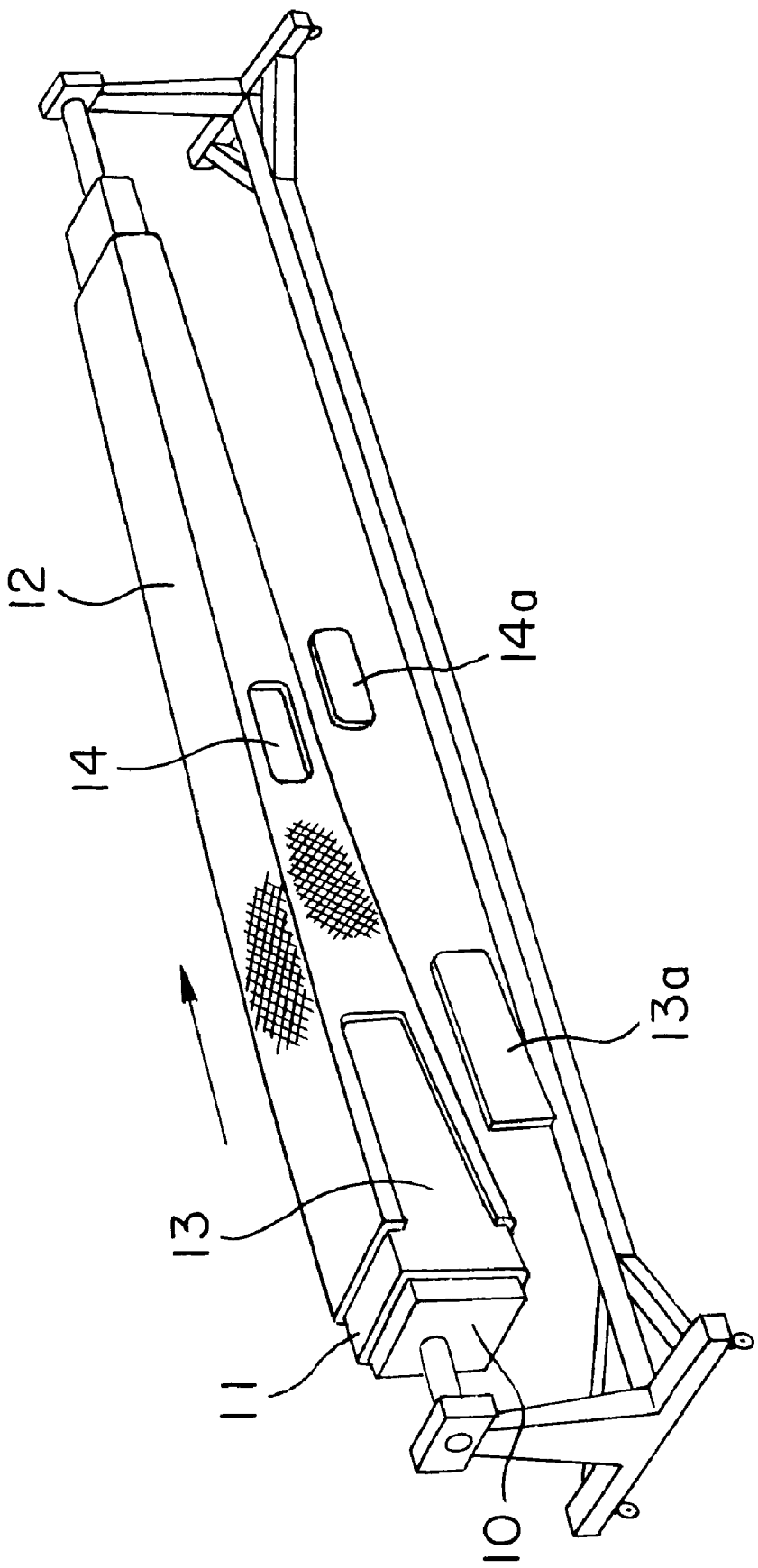
FIG. 3 is a perspective view of a laminating device for fabricating an intermediate spar of a wing of composite material.

A hollow bag (bladder) 11 made of silicone rubber, which has a length longer than that of an intermediate spar 4 and a wall thickness of about 3 mm, is put on a core 10 shown in FIG. 3. A release agent is applied to the hollow bag 11. Prepreg sheets including resin are superposed on the hollow bag 11 put on the core 10 by a fiber-placement automatic laminating machine, so as to form a laminated prepreg structure 12 having in side walls thereof grooves 13 and openings 14 for passing ribs therethrough. The fiber-placement automatic laminating machine controls a laminating angle of the prepreg sheets regardless of variation of spanwise section. Portions of the prepreg sheets corresponding to the groves 13 and the openings 14 may be, for example, cut out. After the laminated prepreg structure 12 has been formed, the core 10 is removed therefrom, and the grooves 13 and the openings 14 are closed by closing plugs 13a and 14a, respectively. Thus, the laminated prepreg structure 12 for the intermediate spar is completed.

Figure 4:
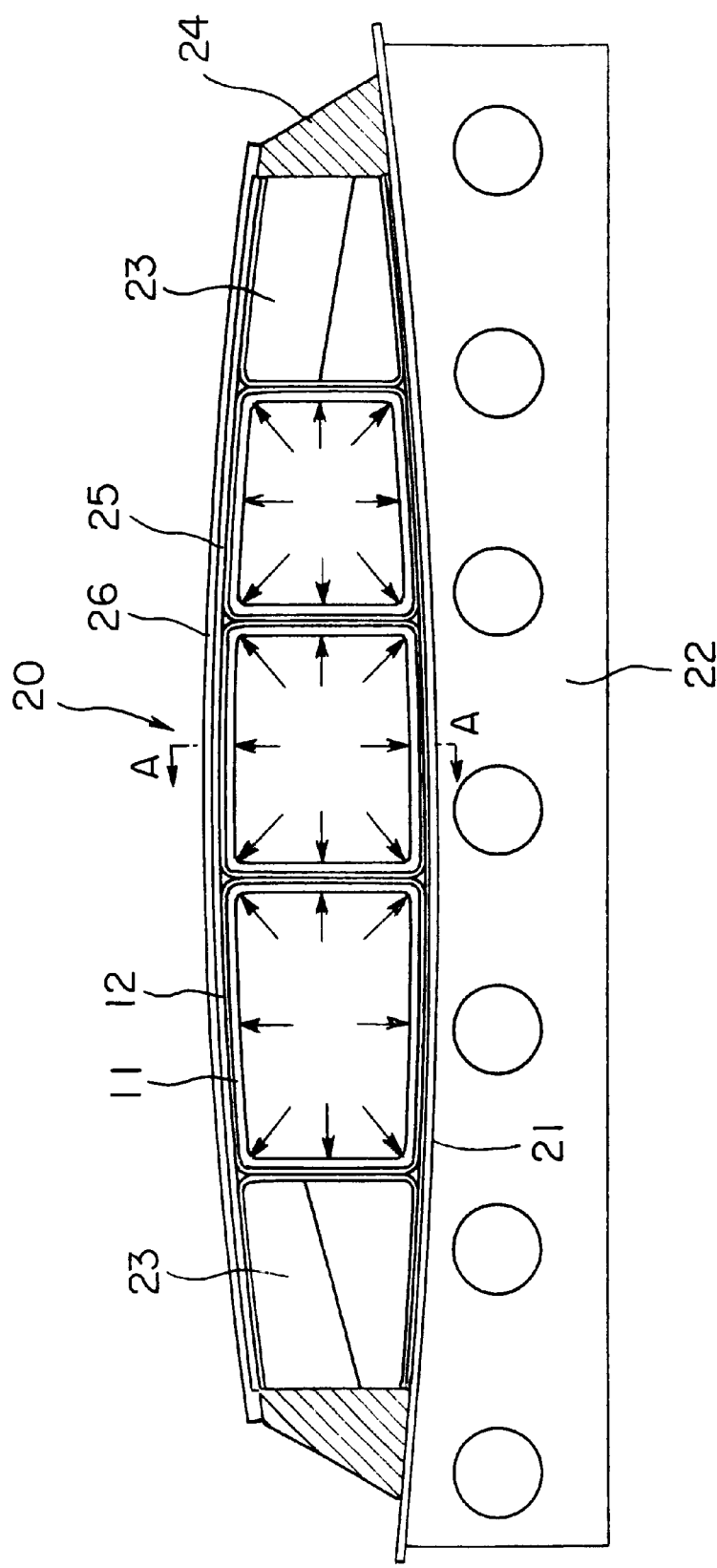
FIG. 4 is a sectional view of a device for fabricating a wing of composite material.

As shown in FIG. 4, prepreg sheets 21 for forming a lower skin are laminated on a lower forming die 22. A plurality of hollow bags 11 holding the prepreg structures 12 thereon are arranged on the laminated prepreg sheets 21 and upper skin prepreg sheets 25 are laminated on the plurality of prepreg structures 12 to form an assembly. Side blocks 23 having upper and lower surfaces of shapes conforming to those of the upper and the lower skins, and fairing bars 24 for holding edge portions of the wing assembly in correct shapes are applied to the assembly. A cowl plate 26 having a lower surface of a shape conforming to a wing surface is placed on the laminated upper skin prepreg sheets 25.

Then, the laminated lower skin prepreg sheets 21, the prepreg structures 12 forming the intermediate spars and covering the hollow bags 11, the laminated upper skin prepreg sheets 25, the cowl plate 26 and the fairing bars 24 are covered with a vacuum bag 27 opening into ends of inside hollows of the hollow bags 11 as shown in FIG. 5. Gaps between the lower forming die 22 and the hollow bags 11 are sealed with sealant strips 28 and 30.

A space covered with the vacuum bag 27 is evacuated and heat and pressure are applied to the laminated lower skin prepreg sheets 21, the prepreg structures 12 and the laminated upper skin prepreg sheets 25. Thus, the laminated lower skin prepreg sheets 21, the prepreg structures 12 forming the intermediate spars and the laminated upper skin prepreg sheets 25, are formed into an integral box structure, i.e., a principal part of the wing of composite material.

The fairing bars 24 are removed from the lower forming die 22, the side blocks 23 and the hollow bags 11 are removed from the integral box structure, and the closing plugs 13a and 14a are removed from the grooves 13 and the openings 14 of the intermediate spars 4.

Then, the ribs 7 each capable of being split into the upper member 7a and the lower member 7b are inserted from one side of the integral box structure through the grooves 13 and the openings 14 of the intermediate spars 4 to the other side of the integral box structure. The ribs 7 are joined to the upper skin 2, the lower skin 3 and the intermediate spars 4 by the ordinary fasteners.

The front edge and the rear edge of the integral box structure provided with the ribs 7 are trimmed. The front spar 5 and the rear spar 6 are attached to the front edge and the rear edge, respectively, of the trimmed integral box structure by ordinary fasteners to complete the wing of composite material.

Since the above method of fabricating the wing of composite material connects the ribs to the integral box structure by the fasteners (fastening means), it needs much less time, the box structure can be formed in a lightweight structure, and the number of parts can be reduced, which enables the wing to be fabricated at a reduced cost.

A method of forming an integral box structure using a thermosetting resin impregnation process will be described with reference to FIGS. 6 and 7.

Referring to FIG. 6, rovings 12a of many filaments are wound in a roving structure round a laminating jig 10a of an iron alloy or a CFRP. Portions of the roving structure are cut out to form grooves 13 and openings 14 for passing ribs therethrough. The grooves 13 and the openings 14 are closed by silicone rubber plates or aluminum alloy plates. The laminating jig 10a is divided longitudinally obliquely into parts to facilitate removing the same from a molded structure formed thereon.

Figure 7:
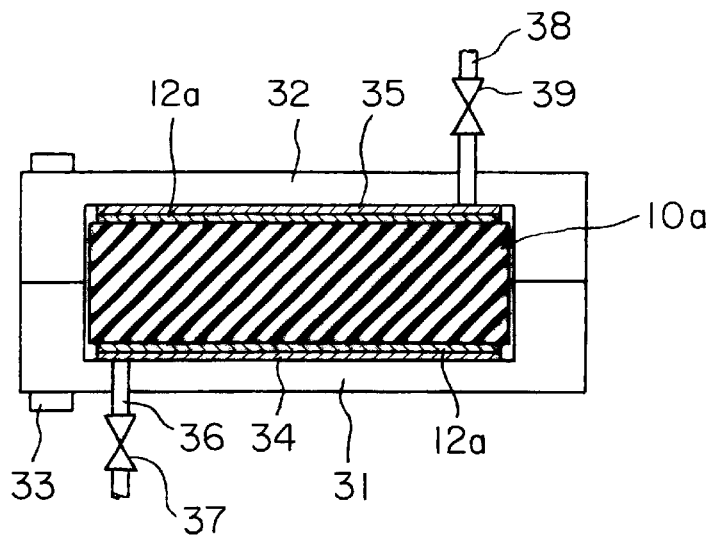
FIG. 7 is a view of another device for fabricating a wing of composite material.

As shown in FIG. 7, fabrics 34 for stiffening a lower skin is superposed on a lower mold 31. A plurality of laminating jigs 10a each holding the roving structure formed by winding the rovings 12a thereon are arranged side by side on the superposed fabrics 34. Fabrics 35 for stiffening an upper skin are superposed on the roving structures held on the laminating jigs 10a, and an upper mold 32 is placed on the fabrics 35. The upper mold 32 and the lower mold 31 are clamped by a clamping device 33 so as to form a sealed space therein. A pipe 36 provided with a valve 37 is connected to the lower mold 31 so as to communicate with the sealed space. A pipe 38 provided with a valve 39 is connected to the upper mold 32 so as to communicate with the sealed space.

The sealed space defined by the upper mold 32 and the lower old 31 is evacuated through the pipe 38 connected to the upper mold 32, and a thermosetting resin is injected into the sealed space through the pipe 36 connected to the lower mold 31. The sealed space is evacuated through the pipe 38 connected to the upper mold 32 until the thermosetting resin injected through the pipe 36 connected to the lower mold 31 into the sealed space overflows the mold through the pipe 38 connected to the upper mold 32. Once the thermosetting resin is sucked into the pipe 38 connected to the upper mold 32, the valve 39 on the pipe 38 is closed and the thermosetting resin is forced and pressed into the sealed space through the pipe 36 connected to the lower mold 31.

Then, heat and pressure is applied to the thermosetting resin injected into the mold to complete an integral box structure, i.e., a principal part of a wing of composite material.

The upper mold 32, the lower mold 31 and the laminating jig 10a are separated from the integral box structure and the silicone rubber plate or aluminum alloy plate are removed. Subsequently, ribs 7 each capable of being split into an upper member 7a and a lower member 7b are inserted from one side of the integral box structure through the grooves 13 and the openings 14 of intermediate spars 4 to the other side of the integral box structure. The ribs 7 are joined to an upper skin 2, a lower skin 3 and the intermediate spars 4 by the ordinary fasteners.

The front edge and the rear edge of the integral box structure provided with the ribs 7 are trimmed. The front spar and the rear spar are attached to the front edge and the rear edge, respectively, of the trimmed integral box structure by ordinary fasteners to complete a wing of composite material.

A molding method of fabricating a wing of composite material employing a co-bond molding method adhesively bonds together a cured member of a composite material and an uncured member of a composite material. In this molding method, two skins are formed beforehand, for example, by a thermosetting composite material laminating process or by a thermosetting resin impregnation process. As mentioned in the description of the method of fabricating a wing employing a thermosetting composite material laminating process, intermediate spars are formed by laminating prepreg sheets on hollow bags, and the intermediate spars are placed via an adhesive on a skin placed on a lower forming die. The other skin is bonded to the intermediate spars with an adhesive to form an assembly. Heat and pressure are applied to the assembly for curing by a method similar to the previously described method of fabricating a wing employing the thermosetting composite material laminating method.

Figure 8:
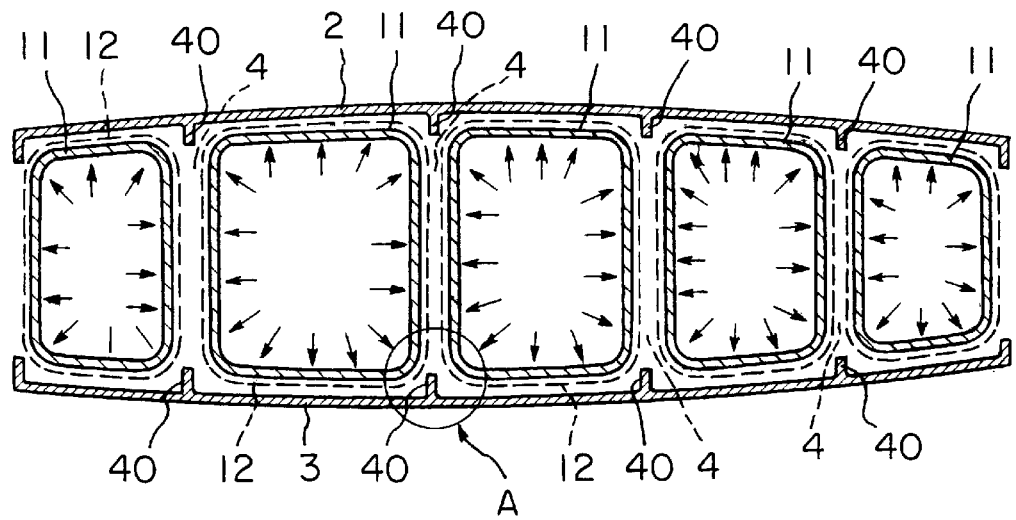
FIG. 8 is a sectional view of a third device for fabricating a wing of composite material.
Figure 9:
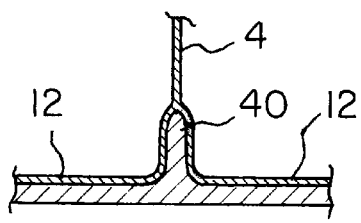
FIG. 9 is an enlarged view of a portion A of FIG. 8.

As shown in FIG. 8, the upper skin 2 and the lower skin 3 may be provided with ribs 40 at positions corresponding to vertical walls, which are formed between the contiguously arranged intermediate spars 4 and extending between the upper skin 2 and the lower skin 3. The skin provided with the ribs 40 is formed by laminating a plurality of prepreg sheets (each of which has a groove at an end thereof) on a plurality of segments of a lower split die having an upper surface of a shape conforming to that of a lower surface of the wing, joining the segments together, laminating additional prepreg sheets on the laminated prepreg sheets, placing an upper die having a lower surface of a shape conforming to that of an upper surface of the wing on the laminated prepreg sheets, and applying heat and pressure to the laminated prepreg sheets.

The laminated prepreg structure 12 formed on the hollow bag 11 is split properly, for example, split into half-circular divisions and the half-circular divisions are arranged so that edge portions thereof do not overlap each other or are not in contact with each other. The laminated prepreg structure 12 thus formed is expanded by the hollow bag 11 that expands when a pressure is applied thereto during a molding process. Thus, laminated prepreg structure 12 can be firmly pressed against and bonded to the skins 2 and 3, and the adjacent intermediate spars 4 can be firmly pressed against and bonded to each other.

The molded skins 2 and 3 provided with the ribs 40 can be individually subjected to a nondestructive test. Thus, nondestructive testing of portions of the wing in the vicinity of the surfaces of the wing, which must be strong, can be facilitated. Since the ribs combined with the skins 2 and 3 increase the rigidity of the skins 2 and 3, the option to select portions at which the skins 2 and 3 are supported for handling the skins 2 and 3 is increased, which may facilitate work for handling the skins 2 and 3.

The wing of composite material according to the present invention can be fabricated by a method wherein plural component members of the wing are formed individually and they are adhesively bonded together. This method is called a secondary bonding method, wherein the skins and the intermediate spars are individually formed and adhesively bonded together.

After the skins and the intermediate spars are formed individually by the thermosetting composite material laminating method or the thermosetting resin impregnation method, the skins and the intermediate spars may be removed from the molds and may be subjected to a shaping process. When the wing is fabricated by this method, the grooves and the openings can be formed in the intermediate spars after curing.

When uniting together the individually formed skins and the intermediate spars, one of the skins is placed on a lower forming die, the intermediate spars are arranged on the skin, and the other skin is placed on the intermediate spars. An adhesive is applied to the joining parts of those component members, and heat and pressure are applied to the joining parts.

The foregoing wing of composite material has the upper skin, the lower skin, the plurality of intermediate spars arranged between the upper and the lower skin. The intermediate spars are extended between the roots and the tips of the upper and the lower skins, and the intermediate spars are formed integrally with the upper and the lower skins or are adhesively bonded to the upper and the lower skins. Thus, the wing needs a relatively small number of component parts and a greatly reduced fabricating time and can be fabricated at a low cost.

The foregoing method of fabricating the wing of composite material having the upper skin, the lower skin, and the plurality of intermediate spars arranged side by side between the upper and the lower skins and extended from the wing root toward the wing tip: forms through holes in the intermediate spars substantially perpendicularly to a longitudinal direction of the intermediate spars, arranges the plurality of intermediate spars on one of the skins with the through holes thereof aligned with each other, places the other skin on the plurality of intermediate spars, adhesively bonds together the intermediate spars and the skins, passes the stiffening ribs through the through holes of the intermediate spars, and connects the stiffening ribs to the intermediate spars and the skins. Thus, the number of parts can be greatly reduced, the stiffening ribs can be easily arranged, the wing of composite material has sufficient structural strength and rigidity and the fabrication of the wing requires greatly reduced manhours.

A wing of composite material in a second embodiment according to the present invention will be described hereinafter.

Figure 10:
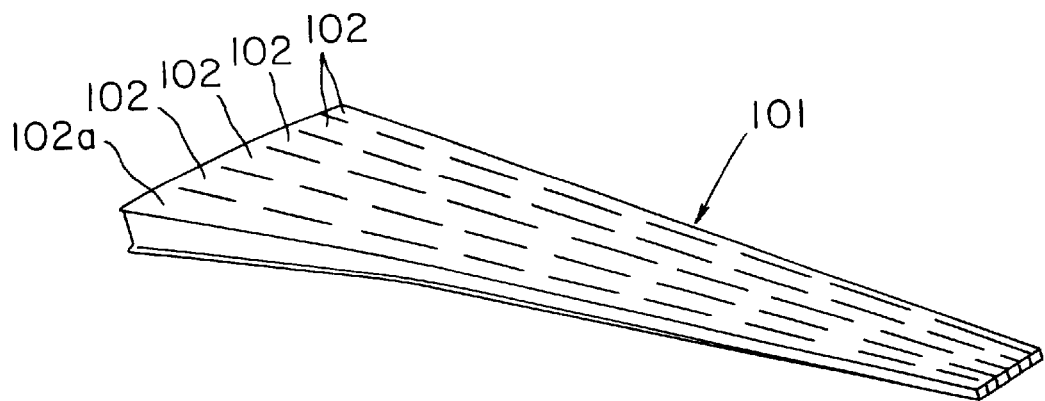
FIG. 10 is a perspective view of an aircraft main wing of composite material in a second embodiment according to the present invention.

FIG. 10 shows an aircraft main wing 101 in a second embodiment according to the present invention in a perspective view. The aircraft main wing 101 has an intermediate spar 102a and a plurality of intermediate spars 102, each of which is made of a composite material and having a U-shaped cross section. The intermediate spars 102a and 102 are arranged in such a manner that longitudinal flanges of adjacent intermediate spars 102a and 102 overlap and are in contact with each other. overlapping portions of the longitudinal flanges of adjacent intermediate spars 102a and 102 are fastened together with fasteners 103 as shown in FIG. 12.

Figure 11:
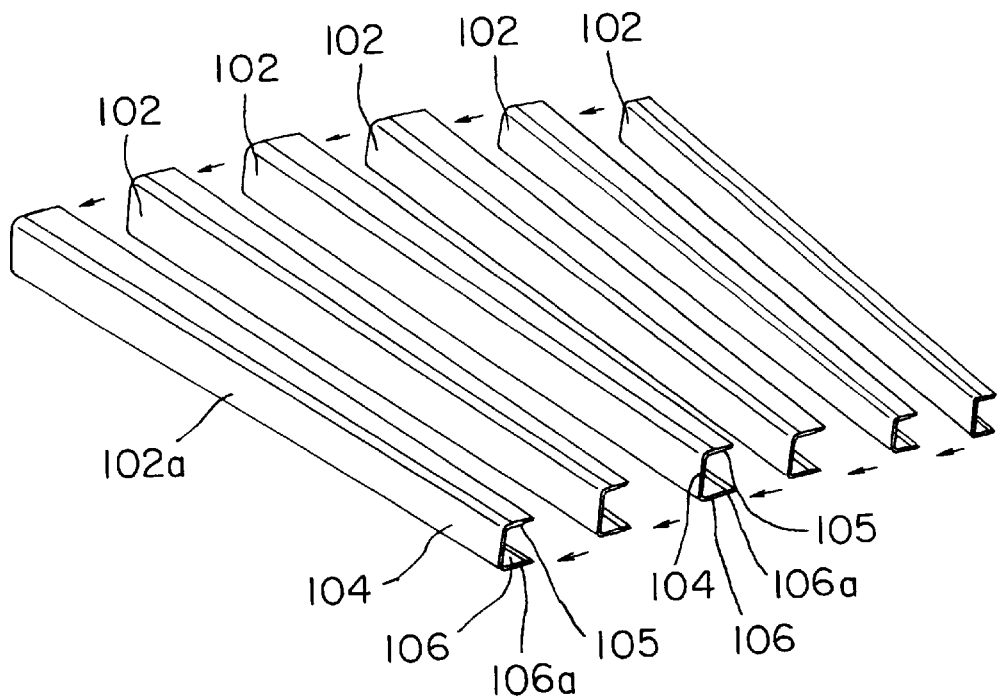
FIG. 11 is an exploded perspective view of the main wing shown in FIG. 10.

As shown in FIG. 11, the intermediate spars 102a and 102 are tapered toward their tips in shapes corresponding to those of divisions of the main wing 101 defined by splitting the main wing 101 spanwise. The intermediate spars 102a and 102 extend between a wing root and a wing tip of the main wing 101. The intermediate spars 102a and 102 are formed individually, for example, by a thermosetting composite material laminating method.

Figure 12:
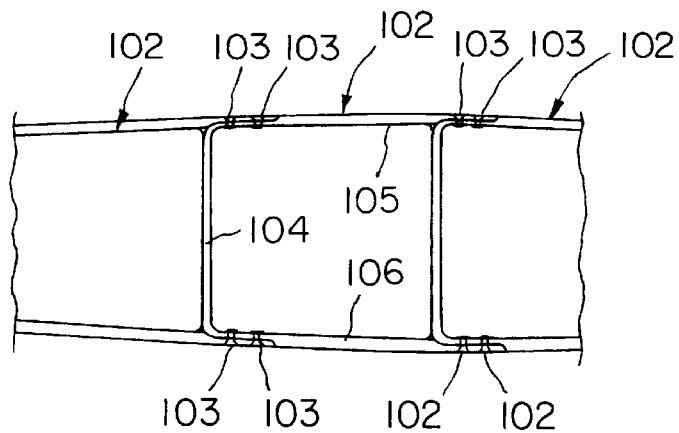
FIG. 12 is a view of joining parts of intermediate spars of a wing of composite material.

As shown in FIGS. 11 and 12, each of the intermediate spars 102a and 102 is a member having a U-shaped cross section and having a web 104 serving as a vertical wall and flanges 105 and 106 formed integrally with the web 104. When adjacent intermediate spars 102a and 102 are arranged in such a manner that flanges 105 and 106 of one of the intermediate spars 102a and 102 overlap portions of flanges 105 and 106 near a web 104 of the adjacent intermediate spar 104 and the overlapping portions of flanges 105 and 106 are fastened together to form the main wing 101 shown in FIG. 10, the upper flanges 105 and the lower flanges 106 form sections of skins of the main wing 101. That is, outer surfaces of the upper flanges 105 of the intermediate flanges 102 and the lower flanges 106 of the same serve as sections of the surfaces of the main wing 101.

Figure 14:
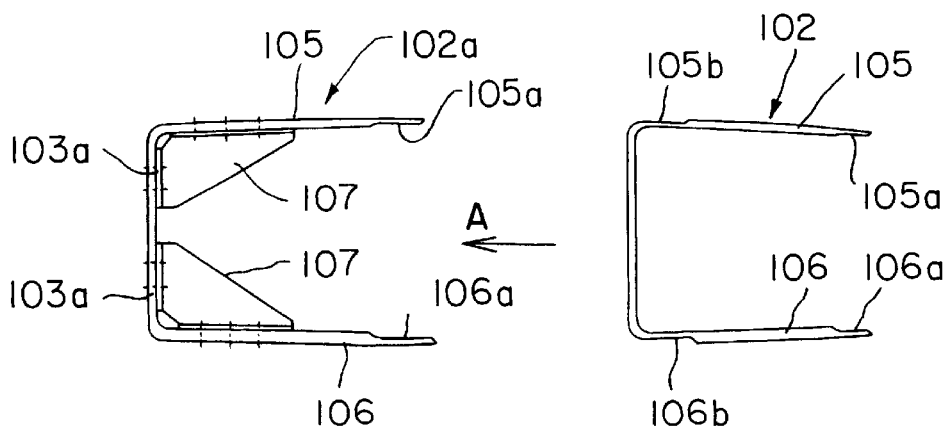
FIG. 14 is a view of intermediate spars of a wing of composite material in a phase before a joining process.

As shown in FIG. 14, the intermediate spar 102a disposed at one end of the arrangement of the intermediate spars 102 has joining parts 105a and 106a formed by recessing inner surfaces of edge portions of the flanges 105 and 106, respectively. The joining parts 105a and 106a of the intermediate spar 102a are formed by reducing the number of prepreg sheets laminated to form the intermediate spar 102a. Thicknesses of the joining parts 105a and 106a are smaller than that of other portions of the flanges 105 and 106 and are, for example, about half the thickness of the other portions of the flanges 105 and 106. The joining parts 105a and 106a are formed in the intermediate part 102a to join the intermediate spar 102a to the adjacent intermediate spar 102 in such a manner that the outer surfaces of the upper flanges 105 of the intermediate spars 102a and 102 are flush with each other and the outer surfaces of the lower flanges 106 of the same are flush with each other so as to conform to the sections of the outer surface of the main wing 101.

As shown in FIG. 14, stiffening members 107 made of a composite material, an aluminum alloy or a titanium alloy are arranged between the web 104 and the flanges 105 and 106 of the end intermediate spar 102a and are fastened to the web 104 and the flanges 105 and 106 by fasteners 103a, before joining the end intermediate spar 102a to the adjacent intermediate spar 102. The end intermediate spar 102a is capable of serving as the rear spar of the main wing 101.

As shown in FIG. 14, the intermediate spar 102 has a joining part 105a formed by recessing an inner surface of an edge portion and a joining part 105b formed by recessing an outer surface of a portion contiguous with the web 104 of the upper flange 105, respectively, and a joining part 106a formed by recessing an inner surface of an edge portion and a joining part 106b formed by recessing an outer surface of a portion contiguous with the web 104 of the lower flange 106, respectively. The joining parts 105a, 105b, 106a and 106b of the intermediate spar 102 are formed by reducing the number of prepreg sheets laminated to form the intermediate spar 102. Thicknesses of the joining parts 105a, 105b, 106a and 106b are smaller than that of other portions of the flanges 105 and 106 and are, for example, about half the thickness of the other portions of the flanges 105 and 106. The joining parts 105a, 105b, 106a and 106b are formed in the intermediate parts 102 to join the adjacent intermediate spar 102 together in such a manner that the outer surfaces of the upper flanges 105 of the intermediate spars 102 are flush with each other and the outer surfaces of the lower flanges 106 of the same are flush with each other so as to conform to sections of the outer surface of the main wing 101.

As shown in FIG. 15, stiffening members, and fixtures for holding a vent tube 108 or other fittings are fastened to the inner surface of the intermediate spar 102 with fasteners 103b or by secondary bonding means, before joining the intermediate spar 102 to the adjacent one.

The intermediate spars 102 and 102a are formed by a thermosetting composite material laminating method or a thermosetting resin impregnation method, which are a generally known method and hence the description thereof will be omitted.

A method of fabricating the aircraft main wing 101 provided with the intermediate spars 102 and 102a will be described hereinafter.

As shown in FIG. 14, the stiffening members 107, which have been made separately, are fastened to the web 104 and the flanges 105 and 106 of the end intermediate spar 102a by fasteners 103a. The fixtures for holding some fitting are also fastened to the end intermediate spar 102a. The stiffening members 107 or the like are easily fastened to the end intermediate spar 102a because the fastening operation can be set eyes on.

As shown in FIG. 14, the intermediate spars 102a and 102 are arranged in parallel to each other in such a manner that a portion of the intermediate spar 102 on the side of the joining parts 105b and 106b is pushed in the direction of the arrow A into a portion of the intermediate spar 102a on the side of the joining parts 105a and 106a. Consequently, the joining part 105a of the upper flange 105 of the intermediate spar 102a and the joining part 105b of the upper flange 105 of the intermediate spar 102 overlap each other and the joining part 106a of the lower flange 106 of the intermediate spar 102a and the joining part 106b of the lower flange 106 of the intermediate spar 102 overlap each other.

Figure 13:
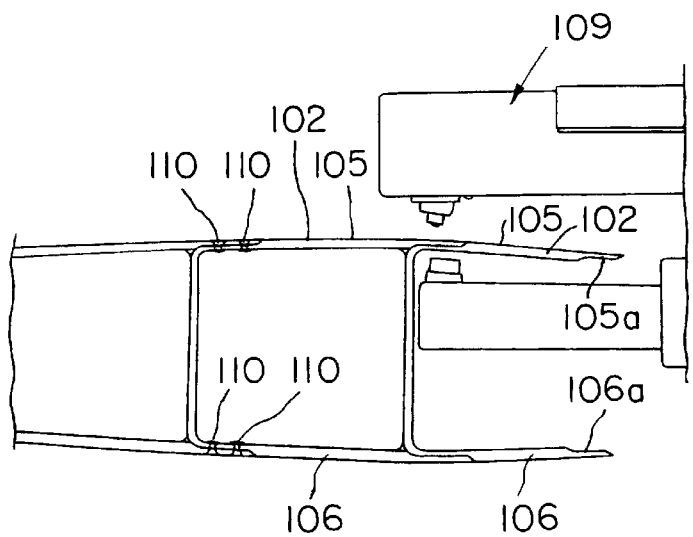
FIG. 13 is a view of a joining device for joining together the intermediate spars of a wing of composite material.

The overlapping joining parts 105a and 105b and the overlapping joining parts 106a and 106b are fastened together with rivets 110 by an automatic riveting machine 109 shown in FIG. 13. Since the respective upper flanges 105 of the intermediate spars 102a and 102 and the respective lower flanges 106 of the same form sections of the skins of the main wing 101, the outer surfaces of the upper flanges 105 of the intermediate spars 102a and 102 and the outer surfaces of the lower flanges 106 of the same form sections of a surface of the main wing 101 when the intermediate spars 102a and 102 are united together as shown in FIG. 10. Since the thickness of the joining parts 105a, 105b, 106a and 106b is smaller than that of other portions of the flanges 105 and 106 and is, for example, half the thickness of the latter, the outer surfaces of the respective upper flanges 105 of the intermediate spars 102a and 102, and the outer surfaces of the respective lower flanges 106 of the intermediate spars 102a and 102 form sections of the gently curved surface of the main wing 101.

As shown in FIG. 15, the fixtures holding the vent tube 108, and stiffening members are fastened with the fasteners 103b to an inner surface of the web 104 of the intermediate spar 102 joined to the end intermediate spar 102a. The vent tube 108 can be easily attached to the web 104 of the intermediate spar 102 because the vent tube 108 is within sight duringwork for attaching the vent tube 108 to the intermediate spar 102.

Then, another intermediate spar 102 is arranged adjacent to the intermediate spar 102 provided with the vent tube 108 as shown in FIG. 15. Then, a portion of the intermediate spar 102 on the side of the joining parts 105b and 106b is pushed into a portion of the intermediate spar 102a provided with the vent tube 108 on the side of the joining parts 105a and 106a. Consequently, the respective joining parts 105a and 105b of the upper flanges 105 of the intermediate spars 102 overlap each other and the respective joining parts 106a and 106b of the lower flanges 106 of the intermediate spars 102 overlap each other.

The overlapping joining parts 105a and 105b and the overlapping joining parts 106a and 106b are fastened together with rivets 110 by the automatic riveting machine 109 shown in FIG. 13. Since the respective upper flanges 105 of the intermediate spars 102 and the respective lower flanges 106 of the same form sections of the skins of the main wing 101, the outer surfaces of the upper flanges 105 of the intermediate spars 102 and the outer surfaces of the lower flanges 106 of the same form sections of the surface of the main wing 101 when the intermediate spars 102 are united together as shown in FIG. 10.

The plurality of intermediate spars 102 are joined together successively in the above manner, and a spar having a short flanges and a U- or I-shaped cross section is joined to the last intermediate spar 102 to complete the aircraft main wing 101.

Intermediate spars having a cross section other than the U-shaped cross section may be used as well. For example, intermediate spars 102b having an I-shaped cross section as shown in FIG. 16 may be used, and intermediate spars 102 having a U-shaped cross section and intermediate spars 102b having an I-shaped cross section may be used in combination as shown in FIG. 17. Although an open space defined by intermediate spars 102 and 102b cannot be used for joining work to join together the intermediate spars 102 and 102b when an intermediate spar 102 having a U-shaped cross section and an intermediate spar 102b having an I-shaped cross section are used in combination, the intermediate spars 102 and 102b can be joined together with blind fasteners, which are generally employed in assembling aircraft.

Although the stiffening members, the fixtures or the fittings are attached to the intermediate spar after joining the intermediate spar to the adjacent one in fabricating the main wing in this embodiment in order to avoid obstructing work for joining the intermediate spar to the adjacent one, the intermediate spar may be joined to the adjacent one after attaching the fittings or the like to the intermediate spar, provided that the fittings or the like are disposed in such a manner that the work for joining the intermediate spar to the adjacent one is not obstructed by the fittings or the like.

The fasteners may be rivets or bolts.

Thus, the main wing of composite material is formed by successively joining together the plurality of intermediate spars of composite material each having the upper and the lower flange and the web so that the upper and the lower flanges of the intermediate spars are arranged to form smooth surfaces conforming to the upper and the lower surfaces of the main wing. Therefore, the main wing has a greatly reduced number of parts and is capable of being assembled by greatly reduced manhours and of being fabricated at a low cost. Since spaces defined by the intermediate spars are easily accessible during assembling processes, the fittings can be easily disposed in the spaces and nondestructive testing can be easily achieved.

In addition, the main wing of composite material is formed by joining together the overlapping portions (joining parts) with the fasteners after the portion of the intermediate spar on the side of the web thereof is arranged into the portion of the adjacent intermediate spar on the side opposite to the web thereof. Therefore, the main wing has a greatly reduced number of parts and is capable of being assembled by greatly reduced manhours and of being fabricated at a low cost. Since spaces defined by the intermediate spars are easily accessible during assembling processes, the fittings can be easily disposed in the spaces and nondestructive testing can be easily achieved.

Figure 18:
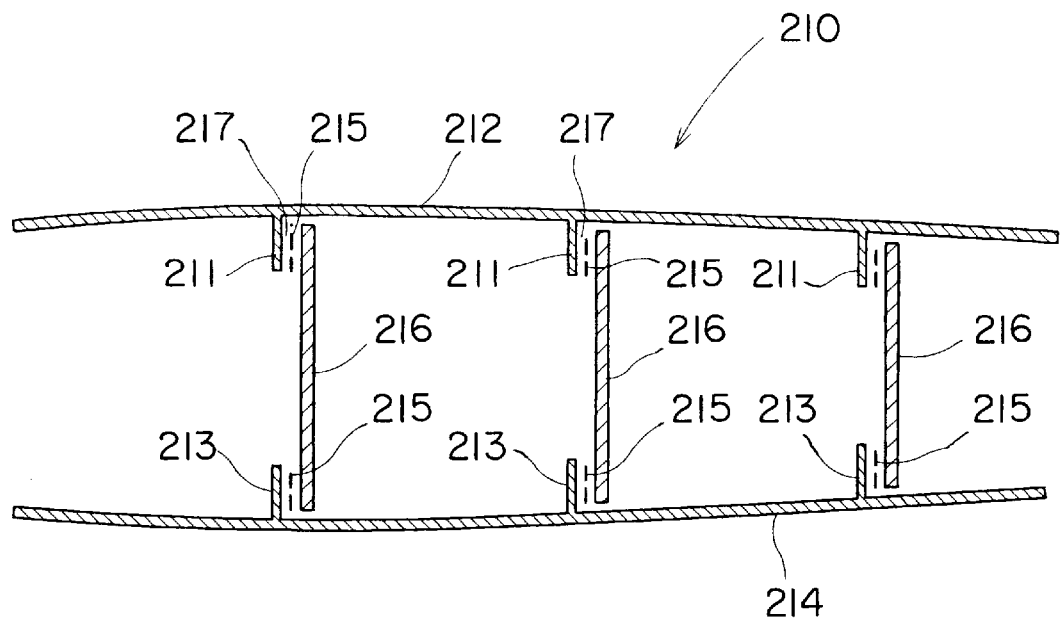
FIG. 18 is a schematic, fragmentary sectional view of a wing of composite material in a third embodiment according to the present invention.

A wing of composite material in a third embodiment according to the present invention will be described hereinafter. Referring to FIG. 18 showing the wing 210 of composite material of the third embodiment in a schematic, fragmentary sectional view, the wing 210 has an upper skin 212 provided with a plurality of stiffening parts 211 projecting from an inner surface thereof, a lower skin 214 provided with a plurality of stiffening parts 213 projecting from an inner surface thereof, and vertical flat plates 216. Each vertical flat plate 216 has upper and lower edge portions bonded to corresponding stiffening parts 211 and 213 of the skins 212 and 214 with adhesive films 215 of a thermosetting adhesive. The flat plates 216 functions as webs of channel-shaped spars. The skins 212 and 214 and the flat plates 216 before molding may be cured members of a fiber-reinforced composite material or half-cured members of a prepreg.

The stiffening parts 211 and 213 of the skins 212 and 214 extend between a wing root and a wing tip of the wing 210 to bear principal load on the wing 210. The stiffening parts 211 and 213 have flat joining surfaces 217, so that the edge portions of the flat plates 216 can be firmly bonded to the stiffening parts 211 and 213.

Figure 19:
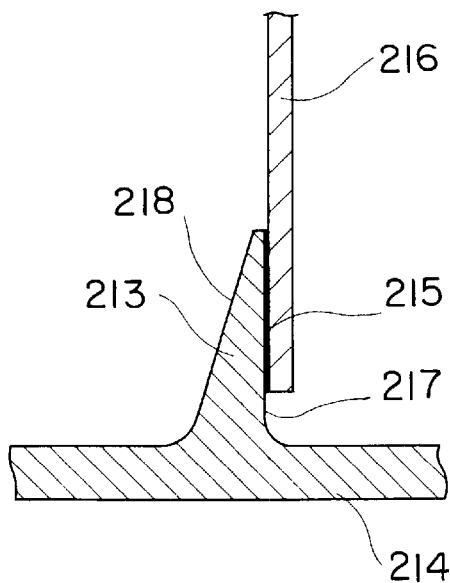
FIG. 19 is a view of a joining part of a skin and a flat plate of a wing of composite material.
Figure 20:
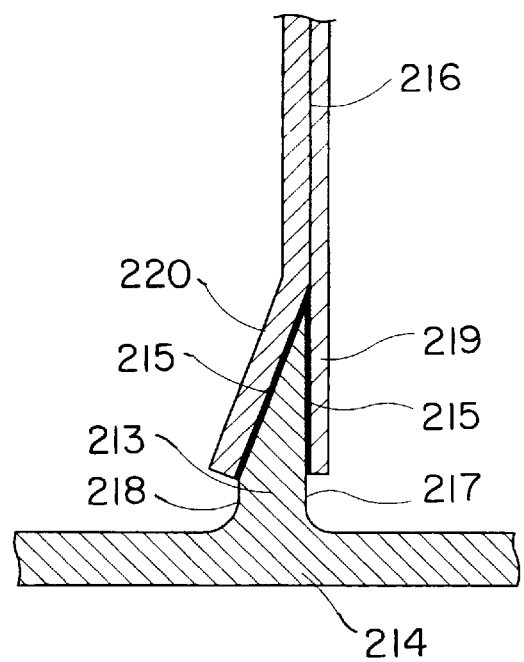
FIG. 20 is a view of another joining part of a skin and a flat plate of a wing of composite material.
Figure 21:
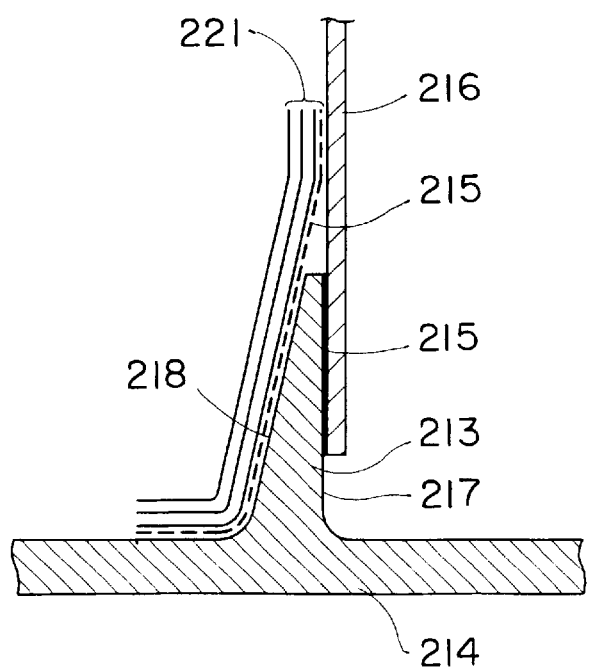
FIG. 21 is a view of a third joining part of a skin and a flat plate of a wing of composite material.

FIGS. 19 to 21 show joints of different types of the stiffening parts 211 and 213 and the flat plate 216; the joints are used selectively according to required strength. Since the joint of the upper edge portion and the stiffening part 211 of the upper skin 212 and the joint of the lower edge portion and the stiffening part 213 of the lower skin 214 are substantially the same, only the joint of the stiffening part 213 of the lower skin 214 and the lower edge portion of the flat plate 216 will be described and the description of the other joints will be omitted.

In the joint of the stiffening part 213 and the flat plate 216 shown in FIG. 19, the stiffening part 213 has a flat joining surface 217 to which the lower edge portion of the flat plate 261 bonded and an inclined back surface 218. The inclined back surface 218 may be replaced with a stepped surface. The lower edge portion of the flat plate 216 is boned to the joining surface 217 of the stiffening part 213 with a thermosetting adhesive film 215.

In the joint of the stiffening part 213 and the flat plate 216 shown in FIG. 20, the stiffening part 213 has a flat joining surface 217 and an inclined joining surface 218 opposite the flat joining surface 217. A lower edge portion of the flat plate 216 is split into two joining portions 219 and 220. The joining portion 219 is bonded to the flat joining surface 217 with a thermosetting adhesive film 215 and the other joining portion 220 is bonded to the inclined joining surface 218 of the stiffening part 213 with a thermosetting adhesive film 215.

In the joint of the stiffening part 213 and the flat plate 216 shown in FIG. 21, the stiffening part 213 has a flat joining surface 217 and an inclined joining surface 218 opposite the flat joining surface 217. A lower edge portion of the flat plate 216 is bonded to the flat joining surface 217 with a thermosetting adhesive film 215. A thermosetting adhesive film 215 and a plurality of superposed prepreg sheets 221 are applied to an area from a lower end of the inclined joining surface 218 to a portion of the flat plate 216 extending upward from the upper end of the stiffening part 213. Heat and pressure are applied to the prepreg sheets 221 to bond the same to the inclined joining surface 218 and the portion of the flat plate 216. The number of the prepreg sheets 221 is dependent on a design of the wing.

Figure 22:
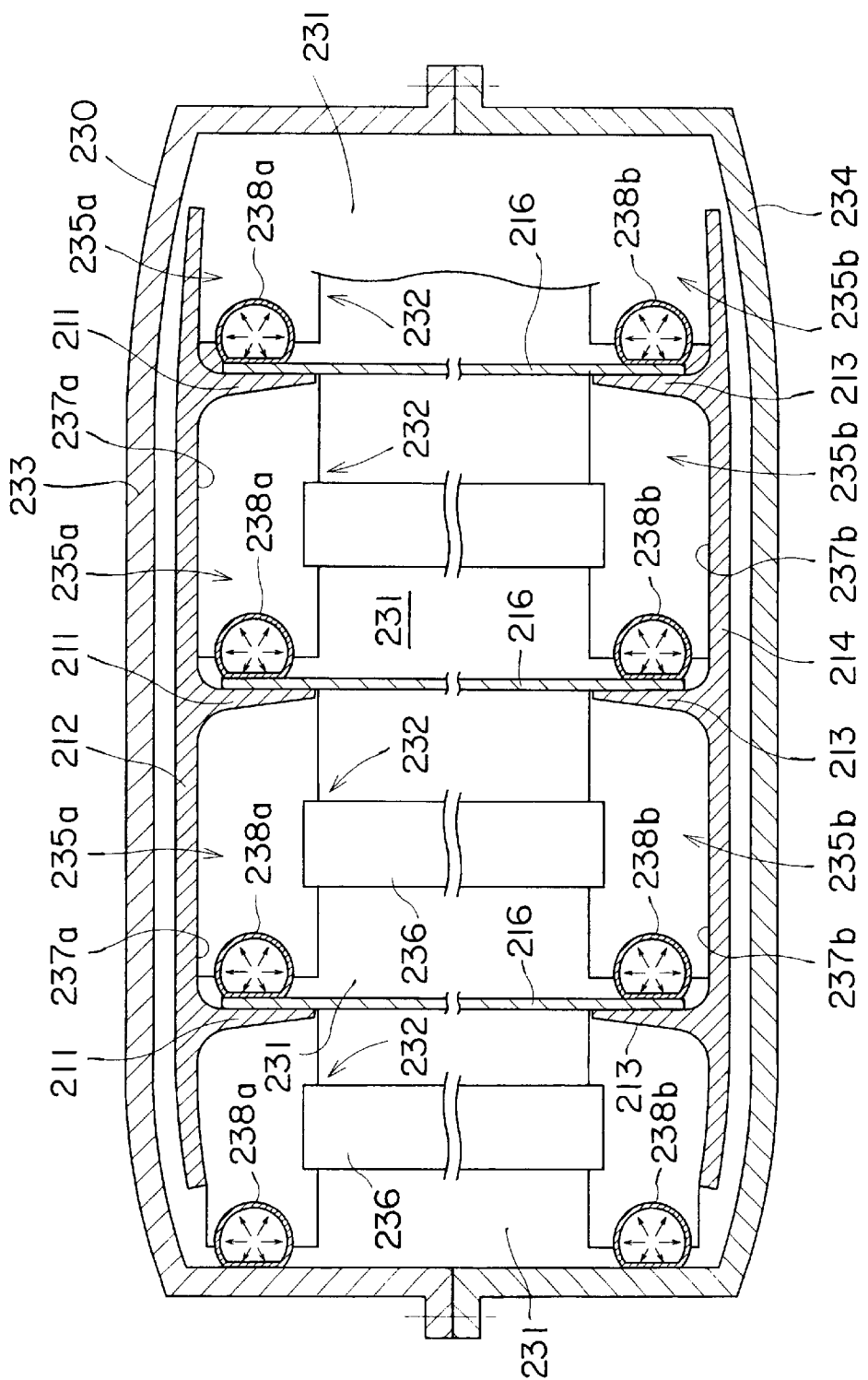
FIG. 22 is a schematic view of a jig for locally applying a bonding pressure to be used in carrying out a method of forming a wing of composite material.

FIG. 22 shows an assembly of the skins 212 and 214 and the flat plates 216 shown in FIG. 19 placed in a split jig 230 in a state before forming. The split jig 230 can be split into an upper half jig 233 and a lower half jig 234. The upper half jig 233 has an inner surface of a shape conforming to an upper surface of the wing and the lower half jig 234 has an inner surface of a shape conforming to a lower surface of the wing. Forming jigs 232 are placed in closed spaces 231 defined by the skins 212 and 214 and the flat plates 216, respectively. Each forming jig 232 has a pair of pressing jigs 235a and 235b, and a stretchable jig 236 for moving the pressing jigs 235a and 235b away from each other.

The pressing jig 235a has a pressure surface 237a for pressing the upper skin 212 against the inner surface of the upper half jig 233 and is provided with a silicone rubber bladder 238a on one side surface thereof. The silicone rubber bladder 238a is expanded by supplying a fluid at a pressure into the silicone rubber bladder 238a to press the upper edge portion of the flat plate 216 against the joining surface of the stiffening part 211 of the upper skin 212. The silicon rubber bladder 238a may be substituted by a silicone rubber solid which can expand to press the upper edge portion of the flat plate 216 against the joining surface of the stiffening part 211 of the upper skin 212 when it is heated.

The pressing jig 235b has a pressure surface 237b for pressing the lower skin 214 against the inner surface of the lower half jig 234 and is provided with a silicone rubber bladder 238b on one side surface thereof. The silicone rubber bladder 238b is expanded by supplying a fluid at a pressure into the silicone rubber bladder 238b to press the lower edge portion of the flat plate 216 against the joining surface of the stiffening part 213 of the lower skin 214. The silicon rubber bladder 238a may be substituted by a silicone rubber solid which can expand when it is heated.

The stretchable jig 236 is a split jig consisting of two longitudinal wedgelike parts respectively having slopes in sliding contact with each other. After clamping the upper half jig 233 and the lower half jig 234, the longitudinal wedgelike parts of the stretchable jig 236 are moved in opposite directions to move the pressing jigs 235a and 235b away from each other to press the upper skin 212 and the lower skin 214 against the upper half jig 233 and the lower half jig 234, respectively.

Figure 23:
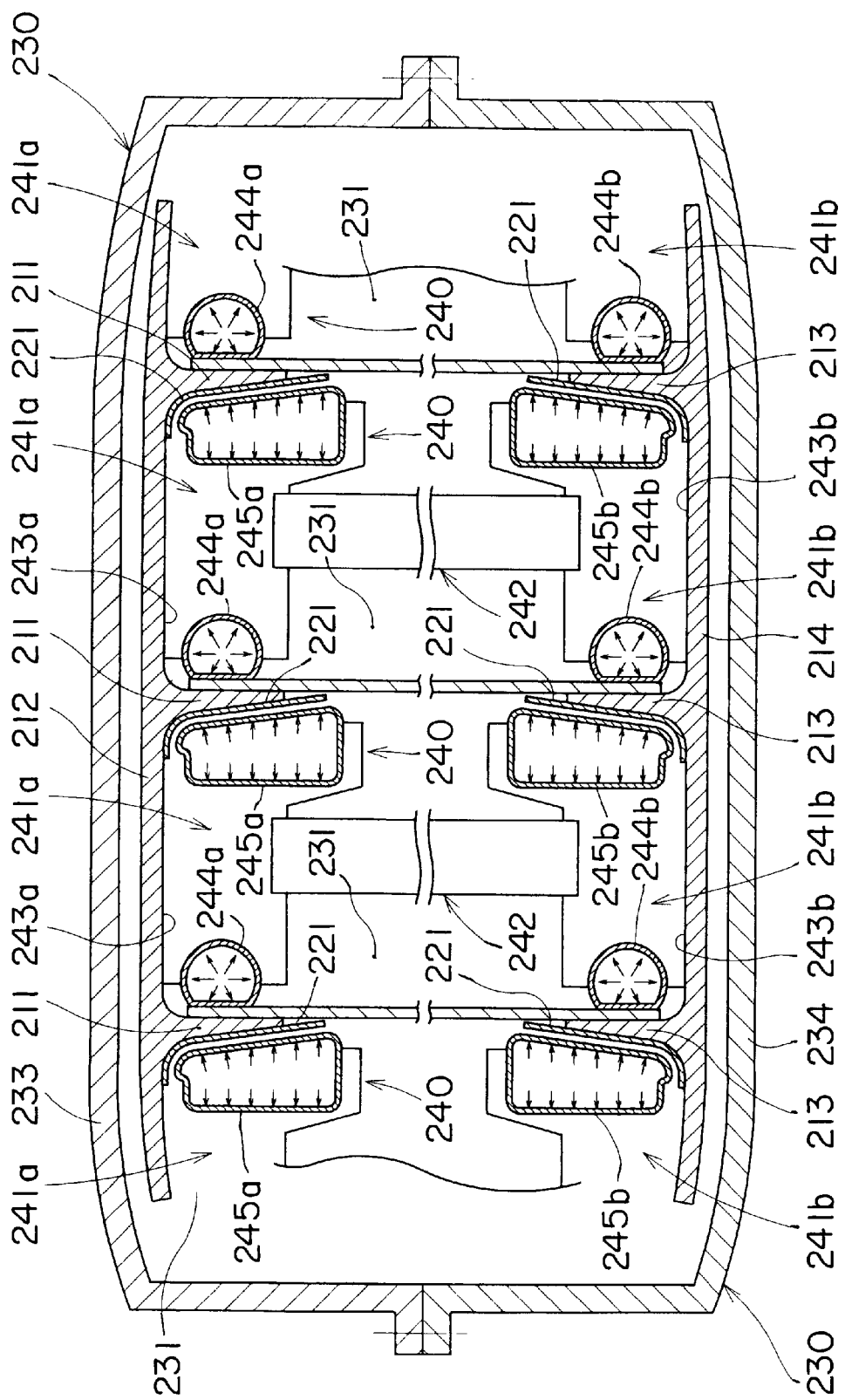
FIG. 23 is a schematic view of another jig for locally applying a bonding pressure to be used in carrying out a method of forming a wing of composite material.

FIG. 23 shows an assembly of the skins 212 and 214 and the flat plates 216 shown in FIG. 21 placed in another split jig 230 in a state before forming. The split jig 230 can be split into an upper half jig 233 and a lower half jig 234. Forming jigs 240 are placed in closed spaces 231 defined by the skins 212 and 214 and the flat plates 216, respectively. Each forming jig 240 has a pair of pressing jigs 241a and 241b, and a stretchable jig 242 for moving the pressing jigs 241a and 241b away from each other.

The pressing jig 241a has a pressure surface 243a for pressing the upper skin 212 against the inner surface of the upper half jig 233 and is provided with silicone rubber bladders 244a and 245a on opposite side surfaces thereof, respectively. The silicone rubber bladder 244a is expanded by supplying a fluid at a pressure into the silicone rubber bladder 244a to press the upper edge portion of the flat plate 216 against the joining surface of the stiffening part 211 of the upper skin 212. The silicone rubber bladder 245a is expanded by supplying a fluid at a pressure into the silicone rubber bladder 245a to press the prepreg sheets 221 against the stiffening part 211 of the upper skin 212 and the flat plate 216.

The pressing jig 241b has a pressure surface 243b for pressing the lower skin 214 against the inner surface of the lower half jig 234 and is provided with silicone rubber bladders 244b and 245b on opposite side surfaces thereof, respectively. The silicone rubber bladder 244b is expanded by supplying a fluid at a pressure into the silicone rubber bladder 244b to press the lower edge portion of the flat plate 216 against the joining surface of the stiffening part 213 of the lower skin 214. The silicone rubber bladder 245b is expanded by supplying a fluid at a pressure into the silicone rubber bladder 245b to press the prepreg sheets 221 against the stiffening part 213 of the lower skin 214 and the flat plate 216.

The stretchable jig 242 is a split jig consisting of two longitudinal wedgelike parts respectively having slopes in sliding contact with each other. After clamping the upper half jig 233 and the lower half jig 234, the longitudinal wedgelike parts of the stretchable jig 242 are moved in opposite directions to move the pressing jigs 241a and 241b away from each other to press the upper skin 212 and the lower skin 214 against the upper half jig 233 and the lower half jig 234, respectively.

When forming the wing shown in FIG. 18, the upper skin 212 provided with the stiffening parts 211 on the inner surface thereof, the lower skin 214 provided with the stiffening parts 213 on the inner surface thereof, and the flat plates 216 that can serve as webs of channel-shaped intermediate spars are individually made of a fiber-reinforced resin composite material.

The upper skin 212 and the lower skin 214 are placed opposite to each other in the split jig. The flat plates 216 are arranged between the upper skin 212 and the lower skin 214 in such a manner that the upper edge portions thereof face the joining surfaces of the stiffening parts 211 of the upper skin 212 through the adhesive films 215, respectively, and that the lower edge portions thereof face the joining surfaces of the stiffening parts 213 of the lower skin 214 through the adhesive films 215, respectively. Then, the upper and the lower end portions of the flat plates 216 are pressed against the joining surfaces of the stiffening parts 211 and 213 and heat is applied to the joining surfaces to bond the flat plates 216 to the stiffening parts 211 and 213 of the skins 212 and 214. Thus, the upper skin 212, the lower skin 214 and the flat plates 216 are united together.

A method of assembling the skins 212 and 214, which are provided with the stiffening parts 211 and 213 shown in FIG. 19, and the flat plates 216 to form a wing of composite material will be described hereinafter with reference to FIG. 22.

The upper skin 212 provided with the stiffening parts 211 on the inner surface thereof, the lower skin 214 provided with the stiffening parts 213 on the inner surface thereof, and the flat plates 216 serving as intermediate spars are individually made of a fiber-reinforced resin composite material. The upper skin 212, the lower skin 214 and the flat plates 216 may be either cured members or semicured members, respectively.

The lower skin 214 is placed on the lower half jig 234. The lower half jig 234 has the inner surface of the shape corresponding to that of the lower surface of the wing.

The flat plates 216 having opposite edge portions covered with the thermosetting adhesive films 215 are set on the lower skin 214 in such a manner that the lower edge portions face the joining surfaces of the stiffening parts 213 of the lower skin 214, respectively.

The forming jigs 232 are placed in spaces between the adjacent flat plates 216, and the upper skin 212 is placed on the forming jigs 232 in such a manner that the stiffening parts 211 thereof face the upper edge portions of the flat plates 216, respectively. The forming jigs 232 may be placed on the lower skin 214 before setting the flat plates 216 on the lower skin 214.

Positions of the forming jigs 232 are adjusted in such a manner that the respective outer surfaces of the skins 212 and 214 are shaped so as to conform accurately to the upper and the lower surface of the wing, respectively. After the completion of the positional adjustment of the skins 212 and 214, the upper half jig 233 is placed on the upper skin 212. The upper half jig 233 has the inner surface of the shape corresponding to that of the upper surface of the wing.

The upper half jig 233 and the lower half jig 234 are clamped together, the stretchable jigs 236 are operated to press the upper skin 212 against the upper half jig 233 by the pressing jigs 235a and to press the lower skin 214 against the lower half jig 234 by the pressing jigs 235b.

Then, the silicone rubber bladders 238a and 238b of the pressing jigs 235a and 235b are expanded by supplying the fluid at the pressure into the silicone rubber bladders 238a and 238b to press the upper and the lower edge portions of the flat plates 216 against the joining surfaces of the stiffening parts 211 of the upper skin 212 and the stiffening parts 213 of the lower skin 214, respectively.

Thus, the skins 212 and 214 and the flat plates 216 are united in an assembly, and the assembly is subjected to a curing process or a thermocompression process to form the wing.

Then, the upper half jig 233 and the lower half jig 234 are separated from the wing, and then the forming jigs 232 are taken out of the wing through the wing root of the wing.

Each of reinforcing members, such as ribs, is a split member consisting of upper and a lower pieces. The upper and the lower pieces are passed through openings formed in the flat plates 216 and are fastened to appropriate portions of the wing with fasteners. The openings formed in the flat plates 216 and inspection holes formed in the skins 212 and 214 are used in attaching other component members to the wing.

A method of assembling the skins 212 and 214, which are provided with the stiffening parts 211 and 213 shown in FIG. 21, and the flat plates 216 to form a wing of composite material will be described hereinafter with reference to FIG. 23.

The assembly of the skins 212 and 214 and the flat plates 216 shown in FIG. 23 differs from that shown in FIG. 22 only in that the assembly shown in FIG. 23 is provided with the prepreg sheets 221 applied to the stiffening parts 211 of the upper skin 212 and the stiffening parts 213 of the lower skin 213. Therefore, the description of the steps of the method of forming the assembly shown in FIG. 23 that are the same as those of the method of forming the assembly shown in FIG. 22 will be omitted.

The forming jigs 240 employed in forming the wing shown in FIG. 23 differ from the forming jigs 232 employed in forming the wing shown in FIG. 22 because the forming jigs 240 need to apply pressure to the prepreg sheets 221 applied to the stiffening parts 211 of the upper skin 212 and the stiffening parts 213 of the lower skin 214.

Each forming jig 240 has the pressing jigs 241a and 241b. The pressing jig 241a is provided with the silicone rubber bladders 244a and 245a on opposite side surfaces thereof, respectively. The pressing jig 241b is provided with the silicone rubber bladders 244b and 245b on the opposite side surfaces thereof, respectively.

In the method of forming the wing shown in FIG. 23, the lower skin 214 is placed on the lower half jig 234 and the prepreg sheets 221 are applied to the inclined surfaces of the stiffening parts 213 of the lower skin 214. The forming jigs 240 are placed on the lower skin 214 and the upper skin 212 is placed on the forming jigs 240. The prepreg sheets 221 are attached beforehand to the inclined surfaces of the stiffening parts 211 of the upper skin 212.

The upper half jig 233 and the lower half jig 234 are clamped together, and the upper skin 212 and the lower skin 214 are pressed against the upper half mold 233 and the lower half mold 234 by the pressing jigs 241a and 241b of the forming jigs 240. Then, the fluid is supplied at the pressure into the silicone rubber bladders 244a and 244b to expand the silicone rubber bladders 244a and 244b and to press the upper and the lower edge portions of the flat plates 216 against the flat joining surfaces of the stiffening parts 211 and 213 of the skins 212 and 214. At the same time, the fluid is supplied at the pressure into the silicone rubber bladders 245a and 245b of the pressing jigs 241a and 241b to expand the silicone rubber bladders 245a and 245b and to press the prepreg sheets 221 against the inclined surfaces of the stiffening parts 211 and 213 of the skins 212 and 214 and against the upper and lower portions of the flat plates 216.

Then, the upper skin 212, the lower skin 214, the flat plates 216 and the prepreg sheets 221 are bonded together by a curing process to form the wing of composite material.

Since the upper and the lower skin of the wing are provided integrally with the stiffening parts that can bear principal load on the wing, the skins have a high rigidity, is easy to handle and has high dimensional stability.

The wing of composite material according to the present invention has an appearance of improved quality and an external shape of improved accuracy because the outer surfaces of the upper and the lower skins are shaped by the surfaces of the jigs. The destructive testing of corners of the wing can be easily achieved because the wing has an open cross section.

In the method of fabricating the wing according to the present invention, the upper and the lower skins are arranged so as to form a box structure of high accuracy, and then pressure is locally applied to the flat plates to join the flat plates to the stiffening parts so as to unite together the upper skin, the lower skin and the flat plates in an integral box structure. Therefore, joints of the upper and the lower skin and the flat plates are space from the corners and nondestructive testing can be easily achieved. Since partial jigs are used to form the box structure without using intermediate jigs that fill up internal spaces of the box structure, the cost for the jigs can be reduced.

The method of forming the wing of composite material makes the component members individually and then assembles the component members. Therefore, the components members can be formed in a thickness effective in enhancing peel strength, and the wing can be formed in a strength-efficient structure having the sufficiently thick stiffening parts that bear the principal and the thin inner members.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A wing of composite material comprising:
   upper and lower skins, each of which has a root and a tip; and
   a plurality of intermediate spars arranged between the upper and lower skins;
   wherein the plurality of intermediate spars extend from the roots to the tips of the upper and lower skins, and at least one of the integrally formed with and adhesively bonded to the upper and lower skins;
   the intermediate spars are provided with openings in their side walls; and
   reinforcing members are passed through the openings and are bonded to the upper and the lower skins and the intermediate spars.

2. The wing of composite material according to claim 1, wherein two additional spars extend from the roots to the tips, on opposite sides of the intermediate spars, and are bonded to the upper and the lower skins.

3. The wing of composite material according to claim 1, wherein the wing of composite material is an aircraft main wing, and the intermediate spars extend from a wing root toward a wing tip.

4. A wing of composite material comprising a plurality of intermediate spars of composite material each having upper and lower flanges forming sections of upper and lower skins, and a web formed integrally with and extending between the upper and lower flange;

wherein the intermediate spars are formed individually and are united together so that surfaces of the upper and lower flanges form surfaces of the upper and the lower skin, respectively. together so that surfaces of the upper and lower flanges form surfaces of the upper and the lower skin, respectively.

5. The wing of composite material according to claim 4, wherein each intermediate spar having the upper and the lower flanges and the web has a U-shaped cross section, adjacent intermediate spars are united together in such a manner that outer surfaces of portions of the flanges contiguous with an outer surface of the web of one of the intermediate spars are in contact with inner surfaces of edge portions of the flanges of the other intermediate spar, and the portions of the adjacent intermediate spars in contact with each other are fastened together with fasteners.

6. The wing of composite material according to claim 4, wherein the wing is an aircraft main wing, and the intermediate spars extend from a wing root toward a wing tip.

7. A wing of composite material comprising:

upper and lower skins of composite material provided with stiffening parts on inner surfaces thereof, respectively; and flat plates extended between and united to the upper and the lower skin by adhesively bonding opposite edge portions thereof to the stiffening parts.

8. The wing of composite material according to claim 7, wherein the flat plates extend between a wing root and a wing tip.

9. The wing of composite material according to claim 8, wherein the number of the flat plates is at least three, and the flat plates are disposed in a parallel arrangement.

10. The wing of composite material according to claim 7, wherein each of the stiffening parts has a flat side surface to which a flat plate is bonded.

* * * * *